June 15, 1926.

G. G. WOLK 1,588,869

PHOTOGRAPHIC FILM

Filed Feb. 12, 1925

INVENTOR
Gerson G. Wolk
BY
Warren S. Orton.
ATTORNEY

Patented June 15, 1926.

1,588,869

UNITED STATES PATENT OFFICE.

GERSON G. WOLK, OF NEW YORK, N. Y.

PHOTOGRAPHIC FILM.

Application filed February 12, 1925. Serial No. 8,627.

The invention relates in general to a photographic film of the type usually sold for installation in a camera and the invention particularly relates to a unit comprising a photographic film and a mask combined therewith for screening part of the film, plate or other sensitized surface hereinafter referred to generally as a film while each sensitized portion is being exposed photographically to take the desired picture.

The primary object of the invention is to provide a simple form of marketable unit which will include a sensitized surface, preferably on a film which can be fed with a step by step movement through the camera as is usual and which when successively exposed will take the picture desired and which when developed will show each picture surrounded by a preformed design or frame.

The invention features an article to all appearances resembling the usual forms of photographic films now on the market, with the usual numbering or other designation to show when each succeeding photographic space is in its proper position in the camera. It is only when developed that it discloses its distinction from conventional forms for it then shows each picture or place where a picture should have been taken framed or surrounded by some fanciful design, cooperating picture, lettering, advertising matter or other showing distinct from the picture taken during the normal exposure.

Broadly this object is attained by exposing portions of the sensitized film at the film factory and then positioning on the previously exposed parts a suitable mask having openings arranged to permit the exposing by the camera user of the unmasked and inexposed portions.

Various other objects and advantages of the invention will be in part obvious from an inspection of the accompanying drawings and in part will be more fully set forth in the following particular description of one form of device embodying my invention, and the invention also consists in certain new and novel features of construction and combination of parts hereinafter set forth and claimed.

In the accompanying drawings:—

Figure 1:
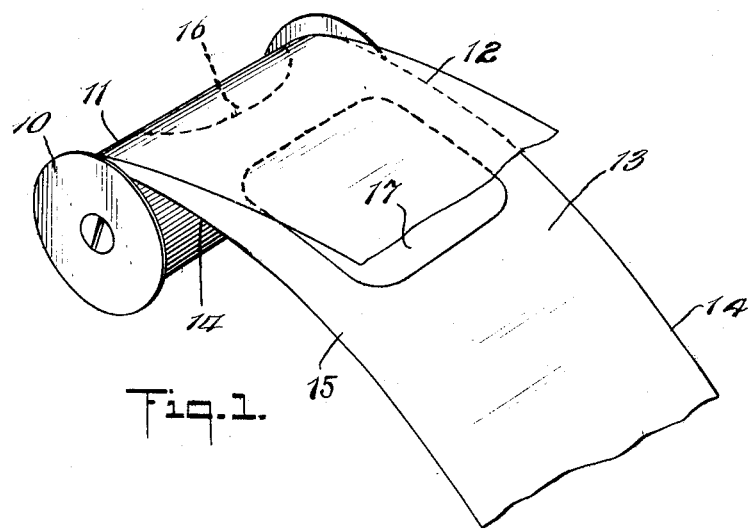
Figure 2:
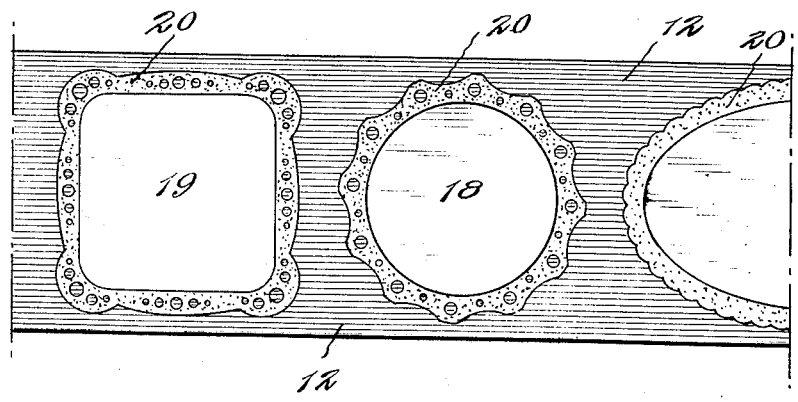

Figure 1 is a view in perspective showing a spool with a two-layer strip thereon constituting a preferred embodiment of the invention, and with the strips partially separated to show the two film construction; and Figure 2 is a plan view of the sensitized film shown in Figure 1 developed to show the preexposed frames for the later exposed pictures not shown.

In the following description and in the claims, parts will be identified by specific names for convenience of expression but they are intended to be as generic in their application to similar parts as the art will permit.

In the drawings there is shown a supply spool 10 of the conventional form now used in the sale of photographic films. Wound on the spool 10 is a film 11 which resembles the photographic film now in general use. In the present instance however the film strip is formed of two films, a sensitized film 12 and a protecting strip or mask film 13. The films are temporarily secured together preferably by the use of an adhesive along the edges 14, such adhesive being used as will readily dissolve when the strip is positioned in the usual developing bath.

The mask film 13 is for the most part opaque and is preferably formed of black paper 15. The mask is provided with a plurality of apertures 16 and 17 or with openings covered with transparent material so as to leave the visually exposed portions 18 and 19 on the sensitized film 12. It is obviously within the scope of the disclosure to make the openings of any configuration. In commercial practice the configurations will be standardized so as to provide standardized outlines or frames for surrounding the pictures taken on the standardized film when exposed and developed.

The sensitized film 12 will before it is developed resemble the film now in general use. However, the portions of the sensitized film which is masked by the protecting strip 13 will have been previously exposed before the masking strip is positioned to cover the previously exposed portions 20.

In manufacturing the article herein disclosed the portions 18 and 19 will be masked and the unmasked portion exposed to some suitable object or design which will impart on the initially exposed part of the sensitized film a design so that when the sensitized film is finally developed the preformed design will be present as a frame 20 about the picture taken on the portion exposed in the camera.

In operation it will be understood that the double film herein disclosed will be mounted in the camera and fed through the camera with a step-by-step movement in the usual way and of course so arranged that the succeeding openings 16 and 17 will register in order to take the succeeding picture on the spaces 18 and 19. When all of the pictures have been taken the film is removed from the camera and subjected to the usual developing operation.

During this developing operation the protecting film will be peeled from the exposed film and removed from the developing bath. When fully developed the exposed film will disclose the several pictures taken in the spaces 18 and 19. Each picture will be framed by the impression 20 which was taken by the film manufacturer.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:—

1. An article of manufacture comprising two superposed films adapted to be fed together through a camera, one of said films being sensitized to constitute a photographic film and the other film being opaque and constituting a mask for the sensitized film, said mask film provided with openings to expose the parts of the sensitized film facing the openings.

2. An article of manufacture comprising two superposed films adapted to be fed together through a camera, one of said films being sensitized to constitute a photographic film and the other film being opaque and constituting a mask for the sensitized film, said mask film provided with openings to expose the parts of the sensitized film facing the openings, and the part of the sensitized film covered by the mask having been previously exposed.

3. An article of manufacture comprising two superposed films adapted to be fed together through a camera, one of said films being sensitized to constitute a photographic film and the other film being opaque and constituting a mask for the sensitized film, said mask film provided with openings to expose the parts of the sensitized film facing the openings, and the part of the sensitized film covered by the mask having been previously exposed but not developed.

4. A camera film comprising a protective film having spaced sight openings, a sensitized film backing the protective film and having portions exposed through said openings, said films temporarily secured together to form a continuous strip.

5. A camera film comprising a protective film having spaced sight openings, a sensitized film backing the protective film and having portions exposed through said openings, said films temporarily secured together to form a continuous strip, and the portion of the sensitized film covered by the protective film having a design photographically impressed thereon but not developed.

6. An undeveloped camera film having a series of spaced apart unexposed sensitized portions, each portion surrounded by a sensitized area which has been exposed.

7. An undeveloped camera film having a series of spaced apart unexposed sensitized portions, each portion surrounded by a sensitized area which has been exposed to form when developed a frame about the picture taken on said portion.

Signed at New York city, in the county of New York and State of New York, this 6th day of February, A. D. 1925.

GERSON G. WOLK.